Patented Sept. 17, 1946

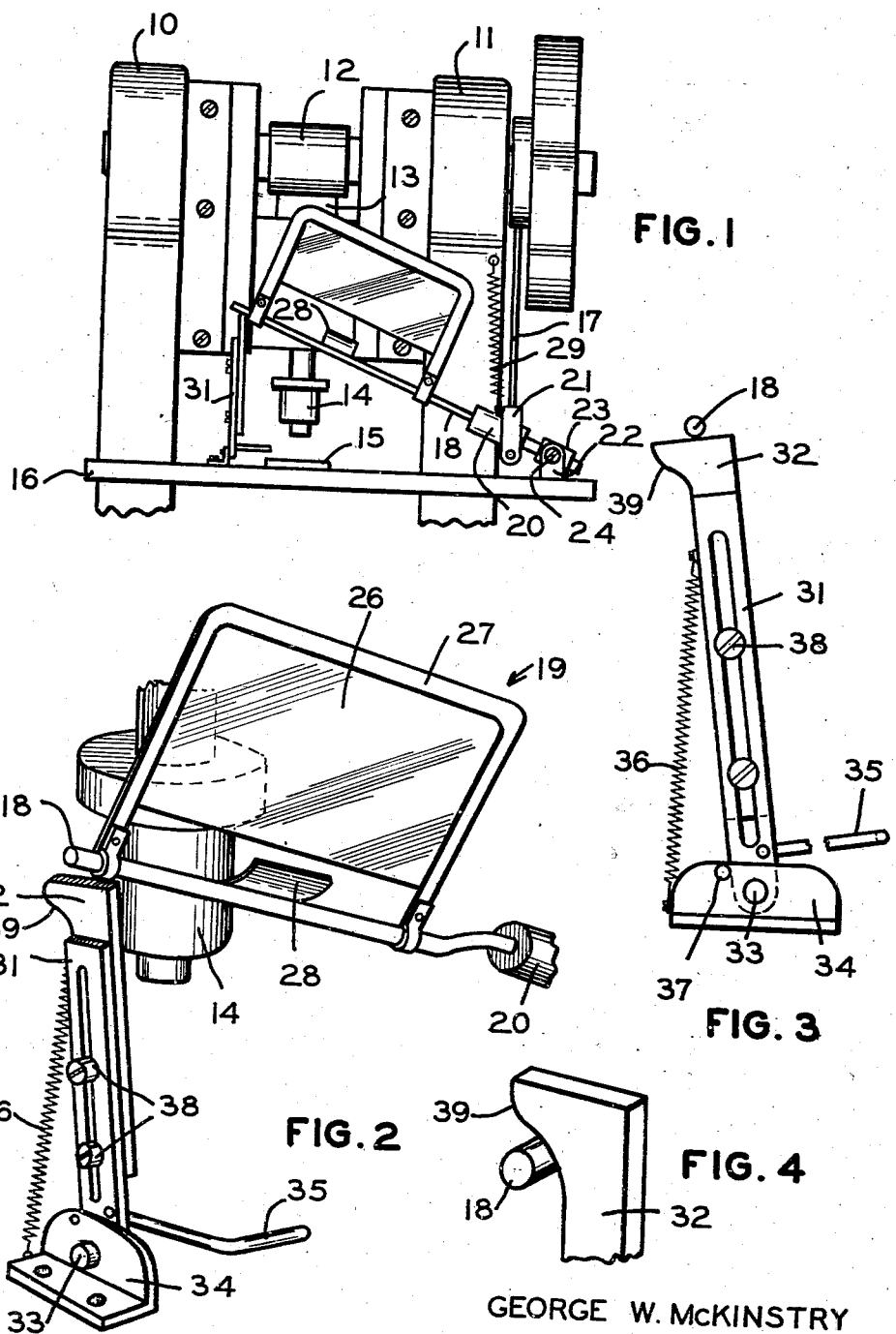

2,407,891

UNITED STATES PATENT OFFICE 2,407,891

SAFETY APPLIANCE

George W. McKinstry, Irondequoit, N. Y., assignor to Bausch & Lomb Optical Company, Rochester, N. Y., a corporation of New York Application May 22, 1943, Serial No. 488,075

5 Claims. (Cl. 74—615)

This invention relates to a safety appliance and more particularly to a locking device for guards used on punch presses, stamping machines, and the like.

Heretofore, it has been customary to provide a guard for stamping machines which utilize a lever arrangement for permitting the machine to be operated when a shield affixed thereto has been positioned in front of the operator to protect the person of the operator from injury caused by accidental forcible dislodgment of the workpiece. As the shield was positioned in its protective plane by depression of a handle affixed to a lever controlling the operation of the machine, the lever arrangement would automatically operate the machine, permitting one of the dies to forcibly impact the workpiece on the other die. Thus, the function of the guard was primarily used as a protection for safeguarding the operator from the forcible ejection of the workpiece on the person of the operator.

In the actual use of the guard, the operator positioned and removed the workpiece on the stationary die with one hand while the other hand depressed the handle to bring the shield in front of the operator and to actuate the machine. Due to the failure to coincide the movements of the hands, in performing this operation, the hand manipulating the workpiece was frequently injured by the movable die because the operator did not remove the hand in the interchange of workpieces with the stationary die in unison with the other hand actuating the machine-operating handle or by the negligence in the operation of the machine.

Thus the guard failed to protect the hands of the operator, and it is an object of the present invention to provide mechanical means employing the use of both of the hands for securing operation of the machine, and to thereby safeguard the hands of the operator from injury resulting from interference with the shaping elements of the machine. This desirable result is achieved by employment of a locking device that retains the guard in an inoperative position and which must be released and held by one hand of the operator while the other hand depresses the handle on the guard to secure operation of the machine. In this manner, both hands of the operator are used to actuate members instrumental for operation of the machine, which precludes injury to the hands by the negligence of the operator.

The present invention is particularly adapted to safeguard the hands of the machine operator in modern production methods. It is of paramount importance when the operator is employed on a piecework incentive basis in which case the operator is intent on securing a maximum quantity of stamped workpieces with a minimum of time expenditure. In so doing, the operator must necessarily be very active in the manipulation of the workpieces and the operation of the machine. Work of this character tends to engender carelessness and negligence in the actions of the operator due to the speed demanded, and also promotes fatigue of the mental and physical faculties, resulting in failure to coordinate these faculties to secure optimum safety in the use of the hands. The safety appliance of the present invention permits the operator to secure the desirable benefits of the piecework system, while guaranteeing the safety of the hands of the operator.

Other novel objects and advantages of the present invention will appear from the following description taken in connection with the acompanying drawing in which:

Fig. 1 is a front elevation of my device attached to a stamping machine.

Fig. 2 is a perspective view of my device applied to a guard of a stamping machine.

Fig. 3 is a side elevation of my device.

Fig. 4 is a perspective view of a fragmentary portion of the guard and safety appliance.

The device of the present invention, for the purpose of illustration, has been shown attached to a stamping machine.

The stamping machine, in the present instance, is shown as a conventional punch press having the usual frame members, generally indicated by the numerals 10 and 11. Between these members there is mounted the operating mechanism comprising a crank shaft 12 to which a plunger 13 is connected for reciprocation thereon. The plunger 13 has an attached coupling member for receiving a removable die 14. The die 14 is movable by the plunger to contact a workpiece supported on a stationary die mounted in a bedplate 15 on a shelf 16 integral with the press. Located at one side of the press is a lever 17 for controlling the motive power operating the press. When the lever 17 is pulled downwardly, the lever will permit the motivating force to actuate the crank shaft 12 for reciprocating the plunger 13. The plunger 13 will force the die 14 onto the workpiece held by the stationary die, forming the workpiece into a desired shape.

In the use of the punch press, it is a common practice to provide a guard to be positioned between the die bedplate and the operator to protect the operator from the workpiece should it be incorrectly struck by the movable die and from fragments broken off from the workpiece when the workpiece is struck by the die. Such guards, generally when lowered to their protecting position, will actuate mechanism to operate the press. The guard, as herein shown, is pivotally mounted at one side of the bedplate of the press and comprises a lever 18 and a transparent shield 19. The lever 18 is fixed in a collar pivotally secured to a yoke 21 on the power controlling lever 17 and is pivotally attached to the shelf 16 of the press by means of a pin 24 passing through openings in a coupling member 22, a collar 23, and the lever 18. The shield 19 comprises a plate 26 of toughened transparent material fixedly secured in a frame 27. The frame 27 has its ends formed in the shape of loops to encircle the lever 18 and is securely fastened thereto. A handle 28 is attached to the lever 18 for manual manipulation of the lever. A spring 29 is fastened to the frame of the press and the yoke 21 of the lever 17 to resist in pulling the lever 17 and the attached lever 18 downwardly to their operative positions, and to normally hold the shield out of its protecting position. When the handle 28 is forcibly depressed by the operator, the guard will move downwardly to a position intermediate the bedplate and the operator, and actuate the lever 17 to cause the operation of the press. It will be clear that the guard when moved to its press operating position will prevent injury to the operator by accidental discharge of the workpiece or fragments thereof when the workpiece is struck by the die.

Many operators to increase their production, while operating the guard with one hand, used their other hand to position the unshaped workpiece on the stationary die and sometimes to remove the shaped workpiece therefrom after operation of the press. In so doing, the hand of the operator manipulating the workpiece, due to fatigue or activity engendering carelessness or negligence, may fail to coordinate itself with the hand actuating the guard and is frequently injured by the descending die.

The safety appliance of the present invention is particularly adapted to prevent injury to the free hand of the operator by incorporating with the guard other mechanism which, spaced from the handle 28, requires actuation by the free hand before the guard can be lowered. This mechanism, in the broader aspects of the present invention, may comprise any means which forces the operator to use his free hand to actuate the same just prior to the actuation of the guard by his other hand. In the now preferred embodiment of the present invention, this means comprises a post 31 pivotally connected by a pin 33 to a bracket 34 mounted on the shelf 16. A bar 32, carried by the post 31, extends upwardly thereof and terminates in a flared portion presenting a relatively long end face. The bar 32 is adjustably mounted to the post 31 by means of bolts 38 passed through a slot formed in the post and threaded into tapped sockets in the bar 32. As the bar is movably mounted to the post, it may be adjusted to bring the end face thereof to a position underlying the free end of the lever 18. It will be seen that with the bar 32 in a position wherein the end face thereof underlies the end of the lever, it will be impossible for an operator to lower the guard carried by the lever. As the end face of the bar 32 is relatively wide, it will be effective to prevent movement of the lever even though the lever is not perfectly aligned with the bar such as might occur through wear of the coupling parts.

To permit the guard to be lowered in the operation of the press, a trip arm 35, fixed to the post 31, is formed with a handle portion spaced from the handle 28 of the lever and which must be grasped by one hand of the operator to pivotally move the bar 32 out of the position shown in Fig. 2 to one wherein the end face thereof no longer interferes with the actuation of the lever 18.

To relieve the operator from manually actuating the handle portion of the trip arm 35 to return the end face of the bar 32 to a position underlying the lever 18, means are provided in the present invention for automatically performing this actuation for the operator. Although various means may be used to secure this desirable result, in the now preferred embodiment of the invention, this means comprises a spring 36, one end of which is fixed to the bracket 34 while the opposite end is connected to the post 31. The spring 36 pivotally moves the post 31 and the bar 32 rearwardly to a position wherein the end face of the bar 32 again lies beneath the end of the lever 18. A stop pin 34, fixed to the bracket 34 limits the return movement of the post 31 and defines the position of the same in which the end face of the bar 32 is disposed beneath the free end of the lever 18.

It will be seen now that depression of the trip arm 35 by one hand of the operator pivotally moves the end face of the bar 32 from its normal position underlying the lever 18 so that the same may be lowered by depression of the handle 28 by the other hand of the operator to actuate the press. Due to the action of the spring 36, the trip arm 35 must be pushed downwardly and retained in its lowermost position by the one hand of the operator until the guard is lowered. Of necessity, the operator must employ both hands to secure operation of the press, thus insuring freedom from injury to the hands, by eliminating any possibility of the hands being inserted between the descending die and the stationary die.

To insure that the lever 18 will return to its normal position over the free end of the bar 32 and without restraint that might otherwise be provided by the under surface of the flared portion of the bar 32, the bar 32 is formed along its rear edge with a cam surface 39 to be engaged by the end of the lever 18 upon its return movement. The camming action brought about by the sliding engagement of the lever 18 along the rear edge of the bar 32 forces the same forward against the action of the spring 36 and permits the lever to ride over the nose of the cam and assume its normal position as shown in Fig. 2.

From the foregoing, it will be apparent that I am able to attain the objects of my invention and provide a new and improved safety appliance which is efficient and trustworthy in operation. Various modifications of structure can be made without departing from the spirit of my invention or the scope of the appended claims.

I claim:

1. In a machine of the type described having a bedplate for holding a workpiece to be acted upon by a die, the combination of means for moving said die into work engaging position; guard means adapted to be actuated by one hand of an operator and movable to a position intermediate said bedplate and the operator, said guard means actuating said moving means as the same is moved to said intermediate position; means for locking said guard means against movement; and means spaced from said guard means and requiring the other hand of the operator to actuate the same to release said locking means.

2. In a machine of the type described having a bedplate for holding a workpiece to be acted upon by a die, the combination of means for moving said die into work engaging position; guard means mounted at one side of said bedplate and adapted to be actuated by one hand of an operator for movement to a position intermediate said bedplate and the operator, said guard means actuating said moving means as the same is moved to said intermediate position; means for locking said guard means against movement; means normally holding said locking means in operative engagement with said guard means; and means mounted on the other side of said bedplate and requiring the other hand of the operator to actuate the same to release said locking means.

3. In a machine of the type described having a bedplate for holding a workpiece to be acted upon by a die; the combination of means for moving said die into work engaging position; guard means mounted at one side of said bedplate and adapted to be actuated by one hand of an operator for movement to a position intermediate said bedplate and the operator, said guard means actuating said moving means as the same is moved to said intermediate position; means for normally holding said guard means out of said intermediate position; means mounted on the other side of said bedplate for locking said guard means against movement; means for normally holding said locking means in an operative engagement with said guard means; and means carried by said locking means for releasing said locking means from said guard means, said means requiring the other hand of the operator to actuate the same to release said locking means, the actuation of the releasing means requiring the use of one hand of the operator in order to permit actuation of the guard means by the other hand of the operator to operate said machine.

4. In a machine of the type described having a bedplate for holding a workpiece to be acted upon by a die; the combination of means for moving said die into work engaging position; guard means mounted at one side of said bedplate and adapted to be actuated by one hand of an operator for movement to a position intermediate said bedplate and the operator, said guard means actuating said moving means as the same is moved to said intermediate position; means for normally holding said guard means out of said intermediate position; means mounted on the other side of said bedplate for locking said guard means against movement; means carried by said locking means and requiring the other hand of the operator to actuate the same to release said locking means; means for returning said locking means to a normal operative position upon release of the actuating means of said locking means, the said holding means moving said guard means out of said intermediate position upon release of the guard means by the operator; and cam means carried by said locking means and engaged by said guard means on its return movement for moving said locking means out of its operative position whereby said guard means may be returned to its normal position by said holding means.

5. In a machine of the class described having a bedplate for holding a workpiece to be acted upon by a die, the combination of means for moving said die into work engaging position; a lever pivotally mounted at one side of said bedplate and pivotally connected to said moving means for movement therewith; a shield attached to said lever for movement therewith to a position intermediate said bedplate and the operator; a handle member secured to said lever and adapted to be actuated by one hand of the operator to move said lever and said shield to said intermediate position, said movement of the lever actuating said moving means; a spring connected to said moving means for normally holding said lever out of said intermediate position; a locking member pivotally mounted at the other side of said bedplate; a second spring connected to said locking member; a stop pin for limiting the movement of said locking member by said second spring whereby said locking member is normally held in a position underlying said lever; a trip arm secured to said locking member and adapted to be actuated by the other hand of the operator to move said locking member out of its underlying position against the action of said second spring; and cam means carried by said locking member and engaged by said lever upon its return movement by said first-named spring for holding said locking member out of the return path of said lever whereby said lever may return to a position wherein said locking means will again become effective.

GEORGE W. McKINSTRY.